July 18, 1967  R. GROSS  3,331,564
HUB FOR FILM CORES AND TIGHT-WOUND MARGINALLY
APERTURED FILM STRIPS
Filed Feb. 2, 1966  2 Sheets-Sheet 1

INVENTOR:
ROBERT GROSS

BY
Breitenfeld & Levine
ATTORNEYS

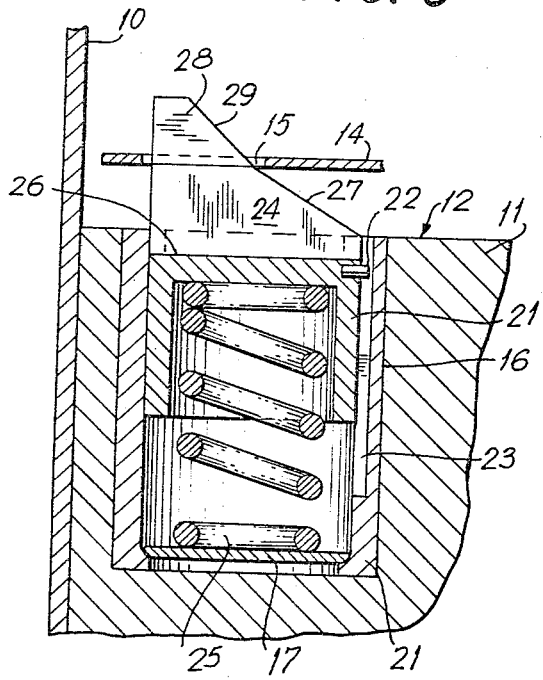
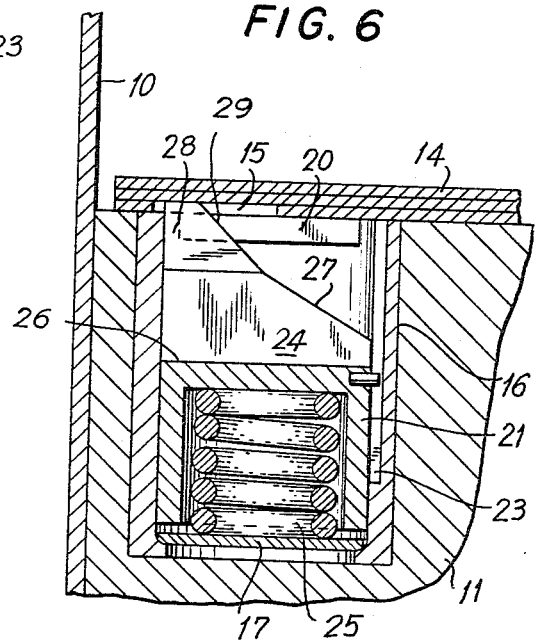
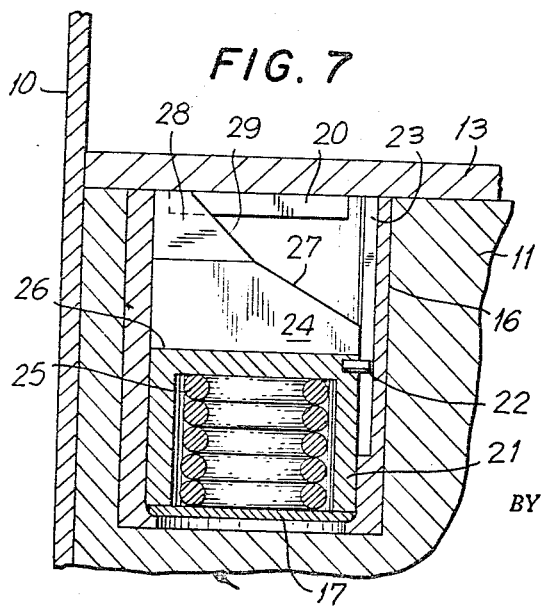

United States Patent Office 3,331,564
Patented July 18, 1967

---

3,331,564
HUB FOR FILM CORES AND TIGHT-WOUND MARGINALLY APERTURED FILM STRIPS
Robert Gross, Scarsdale, N.Y., assignor to Mastereel Industries, Inc., a corporation of New York
Filed Feb. 2, 1966, Ser. No. 524,433
4 Claims. (Cl. 242—71.8)

ABSTRACT OF THE DISCLOSURE

Film flange including hub having a radially movable detent arranged in a radial chamber within hub. Spring in chamber normally urges detent outwardly to engage internal slot in positive film core. Detent has inclined face so that it can be cammed into chamber when negative or neutral core is pushed on to hub.

Outermost region of detent has a rectangular crosssection of reduced dimension for engagement with aperture of a film strip for tight-winding of film on hub. A hollow skirt portion of detent slides within chamber and accommodates the spring.

---

This invention relates generally to devices for receiving wound film strips, and has particular reference to an improved film flange provided with a hub adapted for selective reception of different kinds of film cores or a tight-wound marginally apertured film strip.

The object of the invention is to provide an improved spring-pressed detent assembly by means of which the selective usefulness of the hub is made possible.

The invention is primarily intended for the motion-picture industry, in connection with film winding and re-winding, film editing, film projecting, and film handling in general, but its applicability is not restricted to motion-picture film, and such film is merely illustrative of the type of marginally apertured film-strip material with which the improved detent is intended to engage.

A film flange hub having the capabilities contemplated by this invention has a cylindrical surface, and an outwardly pressed spring-loaded detent projecting from it in a radial direction, closely adjacent to the circular disc to which the hub is attached. Such a hub is shown in Patent No. 3,173,536. It is adapted to receive various cylindrical film cores currently in common use. The inner diameter of such cores is such that they may be snugly applied endwise to the hub, in the direction of the hub axis. In the case of a core having a special recess or slot to accommodate the projecting detent (known as a "positive" core) the detent serves to establish a driving interlock between hub and core. On the other hand, a core having no such recess (e.g., a so-called "negative" core, or a "neutral" core) presses the detent inwardly as it is applied to the hub, and the detent has an inclined outer face to facilitate this camming action. The hub is also adapted to receive a film strip in "tight-wound" relation, i.e. without a core. In this case, the detent serves to establish engagement with one of the marginal film apertures.

A detent serving in these various capacities is subjected to unusually severe repeated strains in various directions askew to its primary reciprocations radial to the hub in which it is mounted. It has been found that the useful life of such a detent is quite short, because it tends to wear down prematurely, causing its movements to become unreliable, and bringing about a looseness conducive to malfunctioning and jamming. One of the factors contributing to these undesirable performance characteristics has been the desire to make the detent small enough to engage with standard marginal film apertures.

By means of the present invention these difficulties have been overcome, without sacrifice in any of the functions to be performed, and without altering the basic nature and mode of operation of the film flange or hub. The features of the invention reside in an improved mounting of the detent, and an improved assembly of moving parts, whereby stauncher and more reliable guidance of detent movements is achieved while the desired interengagement with standard film apertures remains entirely practicable.

These objectives and advantages can be achieved in the manner shown in the accompanying drawings, in which—

FIG. 5 is a cross-sectional view along the line 5—5 of FIG. 4;

FIG. 6 is a view similar to FIG. 5 showing the relationship of the parts after the tight-winding of a film-strip has proceeded; and FIG. 7 is a view similar to FIG. 5 showing the relationship of the parts after an unslotted core has been applied to the hub.

Figure 1:
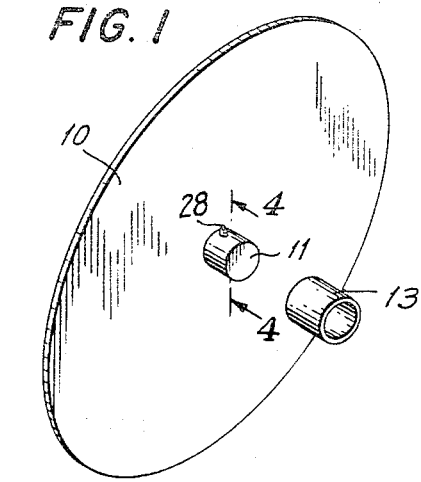
FIG. 1 is a perspective view intended to depict the general relationship of the detent assembly to the film flange, and showing an illustrative film core applicable to the hub.
Figure 4:
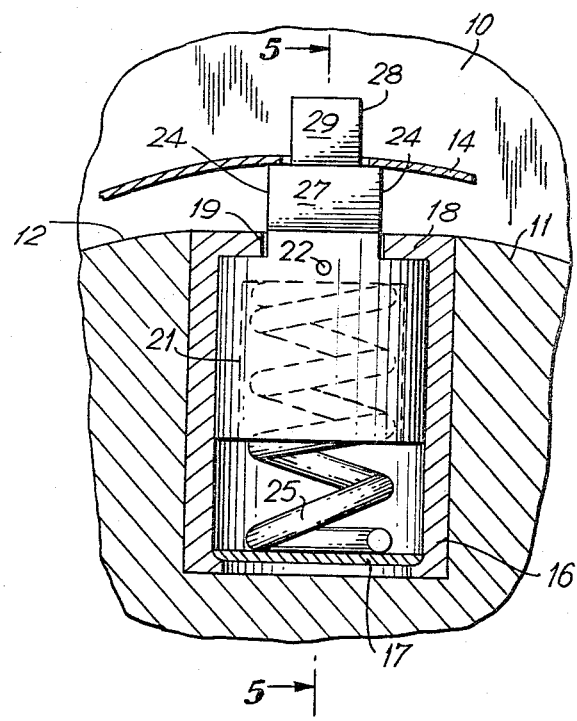
FIG. 4 is an enlarged fragmentary cross-sectional view along the line 4—4 of FIG. 1.
Figure 2:
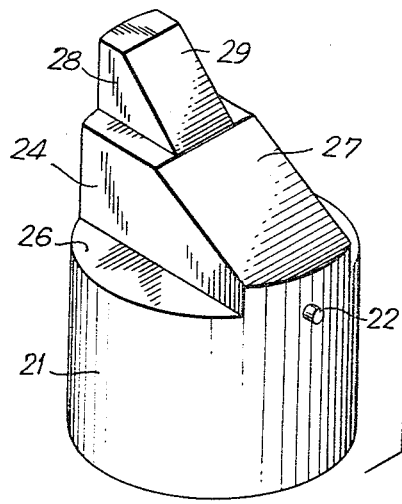
FIG. 2 is a perspective view of the improved detent by itself, and a marginal fragment of a film-strip to be engaged by it.

A film flange of the character to which the invention relates consists essentially of a circular disc 10 and a hub or hub element 11 projecting perpendicularly from the center of one face of the disc 10. The hub element 11 has a cylindrical surface 12 (FIG. 4), and may be circumferentially complete (as shown in FIG. 1 for the sake of simplicity of illustration) or circumferentially interrupted as described in Patent No. 3,173,536. Similarly, while the disc 10 has been shown in FIG. 1 as a simple continuous planar element, it is usually skeletonized, i.e., provided with a plurality of openings which reduce its weight.

The hub is adapted to receive a film core or tube 13 whose inner diameter allows it to be slipped snugly onto the hub in the direction of the hub axis. The end of the core 13 abuts against the disc 10 after it has been fully applied to the hub 11, as indicated in FIG. 7.

The hub 11 is also intended to receive a film strip 14 whose marginal region is provided in known fashion with a succession of substantially rectangular apertures 15. The strip 14 is applicable to the hub without the intervention of a film core.

Figure 3:
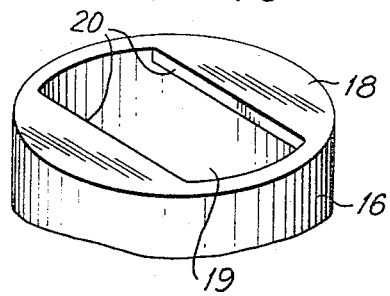
FIG. 3 is a perspective view of the upper part of the detent chamber by itself.

The improved detent assembly is associated with the hub 11 in a location closely adjacent to the disc 10. Mounted in a suitable bore in the hub body, in a radial disposition, is a guide housing or chamber 16, preferably circular in cross-sectional shape. It extends into the hub 11 from the hub surface 12 and is provided at its inner end with a closure wall 17 held in position by the in-turned margin of the side wall of the chamber. At its other end, the chamber is provided with an outer wall 18, preferably formed as an integral part of the side wall of the chamber. The outer face of the wall 18 lies substantially flush with the cylindrical surface 12 of the hub 11. The wall 18 is provided with an opening 19 of non-circular shape. This opening preferably includes a pair of parallel edges 20 (FIG. 3).

Arranged within the guide chamber 16 is a detent element comprising a hollow skirt 21 having an outer diameter adapting it to fit slidably within the chamber 16. To prevent rotative movements of the detent the skirt 21 and the chamber wall are provided with relatively slidable interengaging parts exemplified by the projecting pin 22 on the skirt and the longitudinally extending keyway 23 in the chamber wall.

Surmounted on the skirt 21 is a projecting detent part extending through and conforming in cross-section to the non-circular opening 19. In the device chosen for illustration, the projecting part is of substantially rectangular cross-section, having opposite parallel faces 24 corresponding to the edges 20 of the opening 19.

A compression spring 25 is mounted within the hollow skirt 21 and constantly urges the detent outwardly. The provision of parallel faces 24 on the projecting part creates outwardly facing shoulders 26 which encounter and are stopped by the outer wall 18 of the chamber 16, thus limiting the extent of outward movement of the detent.

The outer face 27 of the projecting part of the detent is inclined, and is so oriented that the force applied by a film core 13, as it is moved axially onto the hub 11, cams the detent inwardly to the fully depressed condition shown in FIG. 7.

The outermost region 28 of the projecting part of the detent is of reduced dimensions and has a substantially rectangular cross-section adapting it to fit readily into one of the marginal film-strip apertures 15. The front face 29 of this part is inclined to serve as a continuation of the camming face 27. The face 27 is inclined, preferably, at an angle of about 30° to the hub axis, to facilitate the camming action when a core 13 is applied; the slope of the face 29 may if desired be slightly steeper so that an adequate height is imparted to the film-engaging tip 28 of the detent.

The inward camming of the detent, as shown in FIG. 7, makes it possible for the hub 11 readily to accept any film core of "neutral" or "negative" type, of which the core 13 is illustrative. Should a core of "positive" type be applied to the hub, the detent will initially be cammed to the position shown in FIG. 7, but relative rotation between the positive core and the hub will bring the slot of the core into the plane of the detent, whereupon the detent will pop into the slot, When a film strip is to be "tight-wound" upon the hub, its end is hooked onto the detent as shown in FIG. 5, and as the winding progresses the successive layers assume the relationship shown in FIG. 6.

The provision of the reduced-size film-engaging tip 28 on the detent makes it possible to make the remainder of the detent, especially the hollow skirt 21, of relatively substantial dimensions adequate to establish a rugged wear-resistant sliding relation to the chamber 16 in which the detent is mounted, and capable of withstanding the transverse and oblique stresses to which the detent is subjected when film cores are applied to it and when film strips are engaged with it for tight-winding. At the same time, the enlarged diametric size of the detent base or skirt allows the camming face 27 to be arranged at a relatively gentle 30° angle while still retaining an adequate amount of detent projection. The provision of a hollow base or skirt on the detent, and the accommodation of the spring 25 within it, contributes to the stability of the detent during its radial movements since the outward pressure is applied to a medial region, directly beneath the projecting part.

While the features of the invention are not dependent upon any specific dimensions, the relative dimensions are of importance, and to indicate the nature of the invention it may be stated, by way of example, that a detent assembly of the character illustrated, well able to function reliably as contemplated and described, and to withstand long periods of repeated usage, has a detent skirt length of about .156 inch and an outside diameter of about .188 inch. To engage with a conventional 35 mm. film strip, the outermost tip of the detent has a rectangular cross-section of about 0.06 x 0.09 inch, and for 16 mm. film the cross-section is about 0.045 x 0.064 inch.

In some respects, it will be understood that the details described and illustrated may be modified by those skilled in the art without necessarily departing from the spirit and scope of the invention as expressed in the appended claims.

What is claimed is:
1. A film flange comprising:
 (a) a hub having a cylindrical surface for selective reception of a film core or a tight-wound marginally apertured film-strip,
 (b) a guide chamber extending radially into said hub, said chamber having an outer wall substantially flush with the hub surface and provided with an opening,
 (c) a detent mounted for radial movement within said chamber, and
 (d) a compression spring within said chamber constantly urging said detent outwardly,
 (e) said detent having a projecting part extending through said opening, said projecting part having side walls and an inclined outer face between said side walls, said inclined face being so oriented that a force applied by a film core in the direction of the hub axis will cam the detent radially inward against the urgence of said spring, and
 (f) the outermost region of said projecting part having a rectangular cross-section, the distance between the side walls of the outermost part being smaller than the distance between the side walls of the remainder of the projecting part, said outermost region being adapted to engage one of the marginal apertures of a film-strip applied thereto.

2. A film flange as defined in claim 1 wherein said opening is of non-circular shape, and said projecting part except for said outermost region conforms in cross-section to the shape of said opening.

3. A film flange as defined in claim 1 wherein said detent includes a hollow skirt projecting inwardly therefrom, said compression spring being located within said skirt.

4. A film flange as defined in claim 1 including relatively slidable interengaging parts on the detent and the chamber wall for preventing rotation of the detent during its radial movements.

References Cited

UNITED STATES PATENTS 3,173,536   3/1965   Gittler et al. _____ 242—71.8

FOREIGN PATENTS 79,331   9/1961   France.

FRANK L. COHEN, *Primary Examiner.*

N. L. MINTZ, *Examiner.*